United States Patent
Chang et al.

(10) Patent No.: US 10,319,340 B2
(45) Date of Patent: Jun. 11, 2019

(54) REAL-TIME COLOR MAPPING SYSTEM AND METHOD

(71) Applicants: DELTA ELECTRONICS, INC., Taoyuan (TW); NATIONAL CENTRAL UNIVERSITY, Taoyuan (TW)

(72) Inventors: Keh-Su Chang, Taoyuan (TW); Mang Ou-Yang, Hsinchu (TW); Ting-Wei Huang, Taipei (TW); Jyun-Wei Jhuang, Hsinchu (TW); Yu-Ta Chen, Taoyuan (TW)

(73) Assignees: DELTA ELECTRONICS, INC., Taoyuan (TW); NATIONAL CENTRAL UNIVERSITY, Taoyuan (TW)

( * ) Notice: Subject to any disclaimer, the term of this patent is extended or adjusted under 35 U.S.C. 154(b) by 81 days.

(21) Appl. No.: 15/722,166

(22) Filed: Oct. 2, 2017

(65) Prior Publication Data

US 2018/0025701 A1    Jan. 25, 2018

Related U.S. Application Data

(63) Continuation of application No. 14/706,158, filed on May 7, 2015, now abandoned.

(30) Foreign Application Priority Data

Sep. 23, 2014    (TW) ............................ 103132698 A

(51) Int. Cl.
   *G09G 5/06*      (2006.01)
   *H04N 1/62*      (2006.01)
      (Continued)

(52) U.S. Cl.
   CPC ................ *G09G 5/06* (2013.01); *H04N 1/62* (2013.01); *H04N 1/644* (2013.01); *H04N 9/67* (2013.01);
      (Continued)

(58) Field of Classification Search
   CPC ......... G09G 2320/0276; G09G 3/3648; G09G 3/3688; G09G 5/06; G09G 2310/0251;
      (Continued)

(56) References Cited

U.S. PATENT DOCUMENTS 5,463,480 A * 10/1995 MacDonald ......... H04N 1/6016
                                                               358/515
6,894,670 B2 * 5/2005 Funakoshi ........... G09G 3/3648
                                                                 345/50

(Continued)

FOREIGN PATENT DOCUMENTS

CN       103379347       10/2013
JP        2004-235993      8/2004

(Continued)

OTHER PUBLICATIONS

RGB Color Codes Chart , Jun. 1, 2014 (Year: 2014).*
Rapid Tables, RGB Color Codes Chart, Jun. 1, 2014.

*Primary Examiner* — Devona E Faulk
*Assistant Examiner* — Ming Wu
(74) *Attorney, Agent, or Firm* — Hauptman Ham, LLP

(57) ABSTRACT

A real-time color mapping system includes a memory and a converting module. The memory is configured for storing a mapping table. The converting module is configured for reading the mapping table stored in the memory, and for converting first image grayscale values corresponding to a first image signal into second image grayscale values corresponding to a second image signal according to the mapping table. The converting module utilizes at least part (Continued)

of bits corresponding to each of the first image grayscale values as a memory address to look up in the mapping table, thereby converting the first image grayscale values into the second image grayscale values. A real-time color mapping method is provided herein as well.

16 Claims, 5 Drawing Sheets

(51) Int. Cl.
*H04N 1/64* (2006.01)
*H04N 9/67* (2006.01)
(52) U.S. Cl.
CPC . *G09G 2320/0673* (2013.01); *G09G 2340/06* (2013.01)
(58) Field of Classification Search
CPC ....... G09G 2320/0242; G09G 2360/18; G09G 3/2014; G09G 3/2025; G09G 3/2074; G09G 3/2081; G09G 2300/0452; G09G 2300/0842; G09G 2310/0262; G09G 2310/027; G09G 2320/028; G09G 2320/0285; G09G 2320/041; G09G 2320/0626; G09G 2320/0673; G09G 2340/0428; G09G 2340/06; G09G 2340/16; G09G 2360/144; G09G 2360/145; G09G 3/02; G09G 3/2003; G09G 3/2011; G09G 3/2018; G09G 3/2022; G09G 3/2029; G09G 2310/0275; G09G 2320/0252; G09G 2320/0261; G09G 3/2051; G09G 3/2092; G09G 3/3208; G09G 3/3233; G09G 3/3258; G09G 3/3283; G09G 3/3291; G09G 3/3607; G09G 3/3614; G09G 3/3696; G09G 5/02; G09G 5/363; G09G 5/393; H04N 1/60; H04N 1/6038; H04N 1/4015; H04N 1/6016; H04N 1/58; H04N 1/52; H04N 1/6019; H04N 1/4052; H04N 1/56; H04N 1/603; H04N 1/6033; H04N 1/6041; H04N 1/6077; H04N 5/202; H04N 5/262; H04N 5/275; G06F 9/30032; G06F 9/30036; G06F 9/3004; G06F 9/30043; G06F 13/1668; G06F 9/30014; G06F 9/30021; G06F 9/322; G06F 9/3853; G06F 9/3879; G06F 9/3885; G06T 15/503; G06T 1/20; G06T 11/001; H03M 1/687; H03M 1/74; H03M 1/742; H03M 1/765; H03M 1/804; B41J 2/2146; B41J 2/2052
See application file for complete search history.

(56) References Cited

U.S. PATENT DOCUMENTS

| | | | |
|---|---|---|---|
| 7,502,150 B2 | 3/2009 | Gotoh et al. | |
| 7,639,399 B2 | 12/2009 | Ikeda | |
| 7,734,105 B2* | 6/2010 | Strom | H04N 19/176 341/51 |
| 7,916,219 B2* | 3/2011 | Kodavalla | H04N 5/202 348/671 |
| 8,405,674 B2 | 3/2013 | Sakai et al. | |
| 8,441,470 B2 | 5/2013 | Hibi | |
| 8,451,200 B2 | 5/2013 | Ohashi et al. | |
| 2004/0184056 A1* | 9/2004 | Ikeda | H04N 1/52 358/1.9 |
| 2005/0264836 A1 | 12/2005 | Gotoh et al. | |
| 2006/0238472 A1* | 10/2006 | Lee | G09G 3/3688 345/89 |
| 2011/0099354 A1* | 4/2011 | Takashima | G06F 9/30036 712/214 |
| 2014/0078267 A1* | 3/2014 | Sato | G09G 3/2059 348/54 |

FOREIGN PATENT DOCUMENTS

| | | |
|---|---|---|
| JP | 2006-014274 | 1/2006 |
| TW | 200818926 | 4/2008 |
| TW | 1366817 | 6/2012 |

* cited by examiner

REAL-TIME COLOR MAPPING SYSTEM AND METHOD

RELATED APPLICATIONS

The present application is a Continuation application of the U.S. application Ser. No. 14/706,158, filed May 7, 2015, which claims priority to Taiwan Application Serial No. 103132698, filed Sep. 23, 2014, all of which are herein incorporated by reference.

BACKGROUND

Technical Field

The present disclosure relates to a real-time color mapping system. More particularly, the present disclosure relates to a real-time color mapping system and a real-time color mapping method for performing color mappings by looking up in a mapping table.

Description of Related Art

With the development of information technology, the applications of display devices are more and more popular. The prices of display devices are getting lower, and the performance of display devices is getting better. Common display devices include LCD displays, LED displays, plasma displays and projectors. When the abovementioned display devices are utilized to display an input image signal (the input image signal can be generated by an electronic system such as a media player, a computer system or a handheld electronic device), the display devices usually need to perform real-time color mappings on the input image signal, so as to display the contents corresponding to the input image signal with more precise or optimized colors.

A conventional real-time color mapping method includes performing color mappings by using gamma curve adjustments. However, the color mappings based on the gamma curve adjustments are not precise enough. Also, it is not easy to perform some specific color mappings on some specific color ranges. Therefore, it is a very important topic in this area to design a more precise real-time color mapping system with more freedom on conversions.

SUMMARY

In one aspect, the present disclosure is related to a real-time color mapping system. The real-time color mapping system includes a memory and a converting module. The memory is configured for storing a mapping table. The converting module is configured for reading the mapping table stored in the memory, and for converting a plurality of first image grayscale values corresponding to a first image signal into a plurality of second image grayscale values corresponding to a second image signal according to the mapping table. The converting module utilizes at least part of bits corresponding to each of the first image grayscale values as a memory address to look up in the mapping table, thereby converting the first image grayscale values into the second image grayscale values.

In another aspect, the present disclosure is related to a real-time color mapping method. The real-time color mapping method includes: reading a mapping table stored in a memory; and utilizing at least part of bits corresponding to each of a plurality of first image grayscale values corresponding to a first image signal as a memory address to look up in the mapping table, thereby converting the first image grayscale values into a plurality of second image grayscale values corresponding to a second image signal.

In the present disclosure, by utilizing the grayscale values of image signals as the memory address to look up in the mapping table, a fast and real-time color mapping between image signals can be performed. Compared with conventional methods (e.g., color mappings based on gamma curve adjustments), the color mapping disclosed in the present disclosure is more precise and provides more freedom on adjustments. The present disclosure also discloses utilizing only a part of bits corresponding to image grayscale values as the memory address to look up in the mapping table. Consequently, the memory space in the memory required to save the mapping table can be greatly reduced. Also, the continuity of the grayscale values can be effectively kept in the converted image signals. In one embodiment of the present disclosure, a near 24 bits color mapping can be performed by utilizing a mapping table occupying only 42M bits of memory space. Therefore, the memory required for color mappings can be reduced, and the speed of color mappings can be improved without affecting the effects of color displaying.

Moreover, the present disclosure also discloses determining whether the table look-up operation on a first image grayscale value is performed by checking whether the first image grayscale value to be converted is within an image grayscale value range. Consequently, the memory space in the memory required to save the mapping table can again be effectively reduced. Moreover, by setting the abovementioned image grayscale value range, color mappings for some specific color ranges can be realized.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
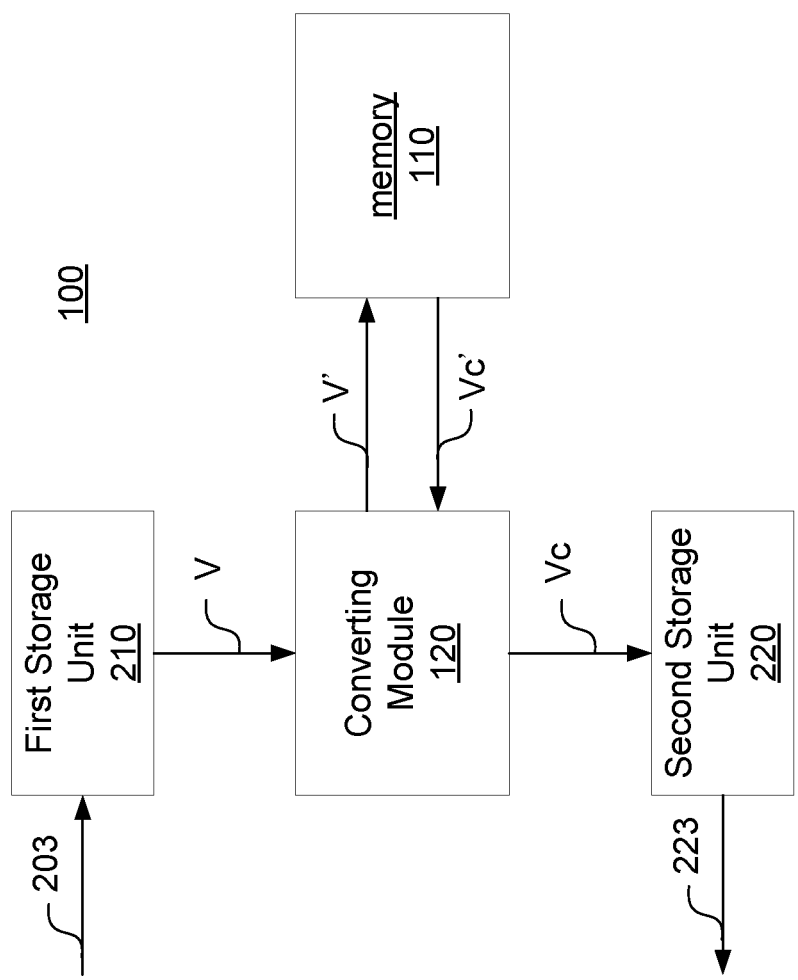
FIG. 1 is a schematic diagram of a real-time color mapping system in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Reference is first made to FIG. 1. FIG. 1 is a schematic diagram of a real-time color mapping system 100 in accordance with one embodiment of the present disclosure. The real-time color mapping system 100 can be implemented on a display device (e.g., a projector, a TV, a screen or a wide color gamut display), and perform color mappings on a first image signal 203 to generate a second image signal 223, but is not limited thereto. The first image signal 203 can be generated by a media player (e.g., a DVD player, a VCD player or a blue-ray disc player), a computer system (e.g., a desktop computer or a laptop computer) or a handheld electronic device (e.g., a smart phone or a tablet computer). The first image signal 203 can also be generated by an optic measuring device (e.g., a colorimeter, a luminometer or a brightness meter). The first image signal 203 can be a high definition multimedia interface (HDMI) signal, but is not limited thereto.

The real-time color mapping system 100 includes a memory 110 and a converting module 120. According to one embodiment of the present disclosure, the memory 110 can be a static random access memory (SRAM), but is not limited thereto. The converting module 120 can be an electric chip, but is not limited thereto. In another embodiment of the present disclosure, the real-time color mapping system 100 includes a memory unit and one or more processors. The converting module 120 is stored in the memory unit and is executed by the one or more processors.

In an embodiment of the present disclosure, the real-time color mapping system 100 optionally includes a first storage unit 210 and a second storage unit 220, in which the first storage unit 210 and the second storage unit 220 are electrically connected with the converting module 120. In another embodiment of the present disclosure, the first storage unit 210 and the second storage unit 220 can be a double data rate synchronous dynamic random access memory (DDR RAM), but is not limited thereto.

The memory 110 is configured for storing a mapping table (not shown). The converting module 120 is configured for reading the mapping table stored in the memory 110, and for converting first image grayscale values V corresponding to the first image signal 203 into second image grayscale values Vc corresponding to a second image signal 223 according to the mapping table. The converting module 120 utilizes at least part of bits V' corresponding to each of the first image grayscale values V as a memory address to look up in the mapping table. The first image grayscale values V are converted into the second image grayscale values Vc according to a look-up result Vc'.

In one embodiment of the present disclosure, the first storage unit 210 is configured for storing first image data (not shown) of the first image signal 203. The first image data include the first image grayscale values V. The second storage unit 220 is configured for storing second image data (not shown) of the second image signal 223. The second image data include the second image grayscale values Vc. Further, the converting module 120 enables the color mapping between the first image data and the second image data to be performed by converting the first image grayscale values V into the second image grayscale values Vc.

In one embodiment of the present disclosure, the converting module 120 utilizes all of the bits corresponding to each of the first image grayscale values V as the memory address to look up in the mapping table, such that the first image grayscale values V are converted into the second image grayscale values Vc. In other words, V' are all of the bits corresponding to the first image grayscale values V, and Vc' are all of the bits corresponding to the second image grayscale values Vc. Further, the converting module 120 utilizes each of the first image grayscale values V as a memory address to look up in the mapping table in the memory 110, respectively, and obtains a corresponding look-up result. Then, the converting module 120 sets the corresponding look-up result to be the corresponding second image grayscale values Vc. In an example, each of the first image grayscale values V is a 24-bits long binary value. The converting module 120 utilizes each of the 24-bits long binary values as a memory address to look up in the mapping table, and obtains look-up results with 24-bits binary values, respectively. The converting module 120 sets the corresponding look-up results as the corresponding second image grayscale values Vc, respectively.

Compared with the abovementioned embodiment, where the converting module 120 utilizes all of the bits corresponding to each of the first image grayscale values V as the memory address to look up in the mapping table, in another embodiment of the present disclosure, the converting module 120 utilizes only part of bits corresponding to each of the first image grayscale values V as the memory address to look up in the mapping table. In another embodiment of the present disclosure, each of the first image grayscale values V includes n first pixel grayscale values with different colors. Each of the n first pixel grayscale values is represented by m bits. The converting module 120 utilizes n×(m−i) bits corresponding to each of the first image grayscale values V as the memory address to look up in the mapping table, in which n>1 and m>i≥1. The abovementioned operations will be explained in more detail in the following paragraph.

Figure 2:
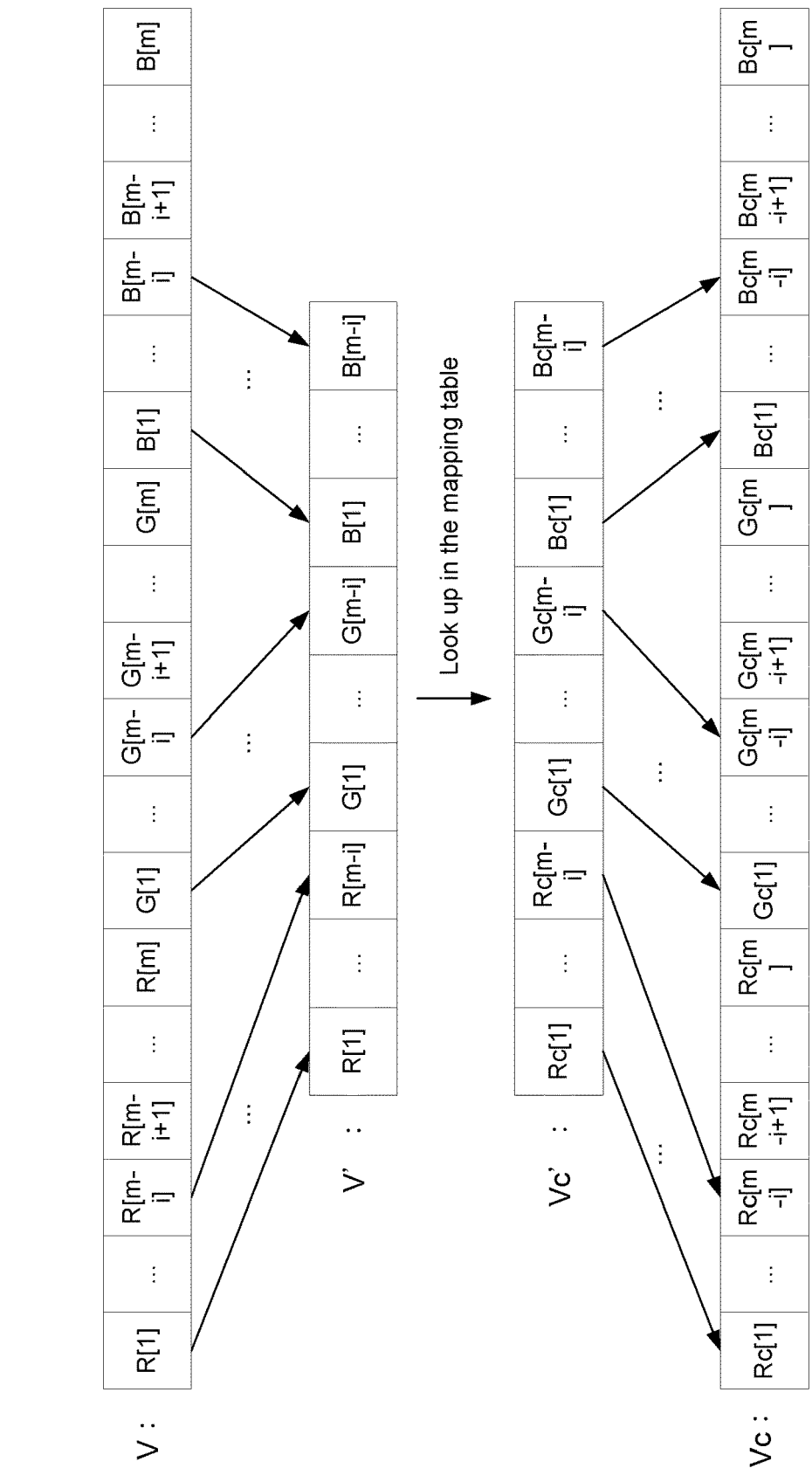
FIG. 2 is a schematic diagram illustrating conversion between one of first image grayscale values and a corresponding one of second image grayscale values.

Reference is made simultaneously to FIG. 2. FIG. 2 is a schematic diagram illustrating that the converting module 120 converts one of the first image grayscale values V to a corresponding one of the second image grayscale values Vc. For simplicity of explanation, FIG. 2 is illustrated based on the embodiment shown in FIG. 1, but is not limited thereto.

It is noted that, in the present embodiment, n is 3. However, in practical applications, n is not limited to 3. The value of n can be adjusted by persons skilled in the art according to practical needs.

As shown in FIG. 2, each of the first image grayscale values V includes first pixel grayscale values with three different colors (e.g., red, green and blue). Each of the first pixel grayscale values is represented by m bits. To be more precise, the abovementioned three first pixel grayscale values are corresponding to R[1]-R[m], G[1]-G[m] and B[1]-B[m], respectively. Each of the second image grayscale values Vc includes three corresponding second pixel grayscale values, and each of the three second pixel grayscale values is represented by m bits as well. In other words, the three second pixel grayscale values are corresponding to Rc[1]-Rc[m], Gc[1]-Gc[m] and Bc[1]-Bc[m], respectively.

In an example, when m is 8, and a red first pixel grayscale value is 146, the red first pixel grayscale value is corresponding to 10010010. When a green first pixel grayscale value is 61, the green first pixel grayscale value is corresponding to 00111101. When a blue first pixel grayscale value is 171, the blue first pixel grayscale value is corresponding to 10101011.

The converting module 120 utilizes 3×(m−i) bits corresponding to each of the first image grayscale values V as the memory address to look up in the mapping table, and converts the 3×(m−i) bits of each of the first image grayscale values V into a corresponding 3×(m−i) bits of each of the second image grayscale values Vc.

In the present embodiment, the converting module 120 utilizes the highest (m−i) bits of each of the three first pixel grayscale values as the memory address to look up in the mapping table, and sets the look-up result Vc' (with a length of 3×(m−i) bits) to be the highest (m−i) bits of a corresponding one of the three second pixel grayscale values.

Further, the converting module 120 utilizes the 3×(m−i) bits V' consisting of R[1]-R[m−i] of R[1]-R[m], G[1]-G[m−i] of G[1]-G[m] and B[1]-B[m−i] of B[1]-B[m] as the memory address to look up in the mapping table, and obtains the look-up result Vc'.

The converting module 120 then sets Rc[1]-Rc[m−i], Gc[1]-Gc[m−i] and Bc[1]-Bc[m−i] of the look-up result Vc' to be the highest (m−i) bits of a corresponding one of the three second pixel grayscale values, respectively.

According to one embodiment of the present disclosure, the converting module 120 is further used for integrating the n×i un-converted bits and the corresponding n×(m−i) converted bits of each of the first image grayscale values V, so as to generate a corresponding second image grayscale values. As shown in FIG. 2, the converting module 120 integrates the 3×i un-converted bits R[m−i+1]-R[m], G[m−i+1]-G[m] and B[m−i+1]-B[m], and the 3×(m−i) converted bits Rc[1]-Rc[m−i], Gc[1]-Gc[m−i] and Bc[1]-Bc[m−i] of the first image grayscale value V to generate the corresponding second image grayscale value Vc.

According to another embodiment of the present disclosure, the converting module 120 optionally includes a delay unit (not shown). In one embodiment, the delay unit is a circuit. In another embodiment, the delay unit is realized by a software module. The delay unit is configured for delaying the n×i un-converted bits of each of the first image grayscale values V for a period of time to compensate the time needed by the converting module 120 to look up the n×(m−i) bits corresponding to each of the first image grayscale values V in the mapping table stored in the memory 110. Consequently, the converting module 120 can integrate the n×i un-converted bits and the corresponding n×(m−i) converted bits of each of the first image grayscale values V to generate a corresponding second image grayscale value Vc when the look-up operation is finished.

According to another embodiment of the present disclosure, the lowest i bits of each of the three second pixel grayscale values are the same as the lowest i bits of each corresponding pixel grayscale value of the three first pixel grayscale values. As shown in FIG. 2, in the corresponding second image grayscale value Vc, the lowest i bits Rc[m−i+1]-Rc[m] of the second pixel grayscale value Rc[1]-Rc[m] are the lowest i bits R[m−i+1]-R[m] of the first pixel grayscale value R[1]-R[m]. The lowest i bits Gc[m−i+1]-Gc[m] of the second pixel grayscale value Gc[1]-Gc[m] are the lowest i bits G[m−i+1]-G[m] of the first pixel grayscale value G[1]-G[m]. The lowest i bits Bc[m−i+1]-Bc[m] of the second pixel grayscale value Bc[1]-Bc[m] are the lowest i bits B[m−i+1]-B[m] of the first pixel grayscale value B[1]-B[m].

In other words, the converting module 120 sets Rc[1]-Rc[m−i], Gc[1]-Gc[m−i] and Bc[1]-Bc[m−i] of the look-up result Vc' to be the highest (m−i) bits of a corresponding one of the three second pixel grayscale values, respectively, and the lowest i bits of each of the three first pixel grayscale values to be the lowest i bits of a corresponding one of the three second pixel grayscale values, respectively. An example will be given in the following paragraph to further explain the abovementioned operations.

Figure 3:
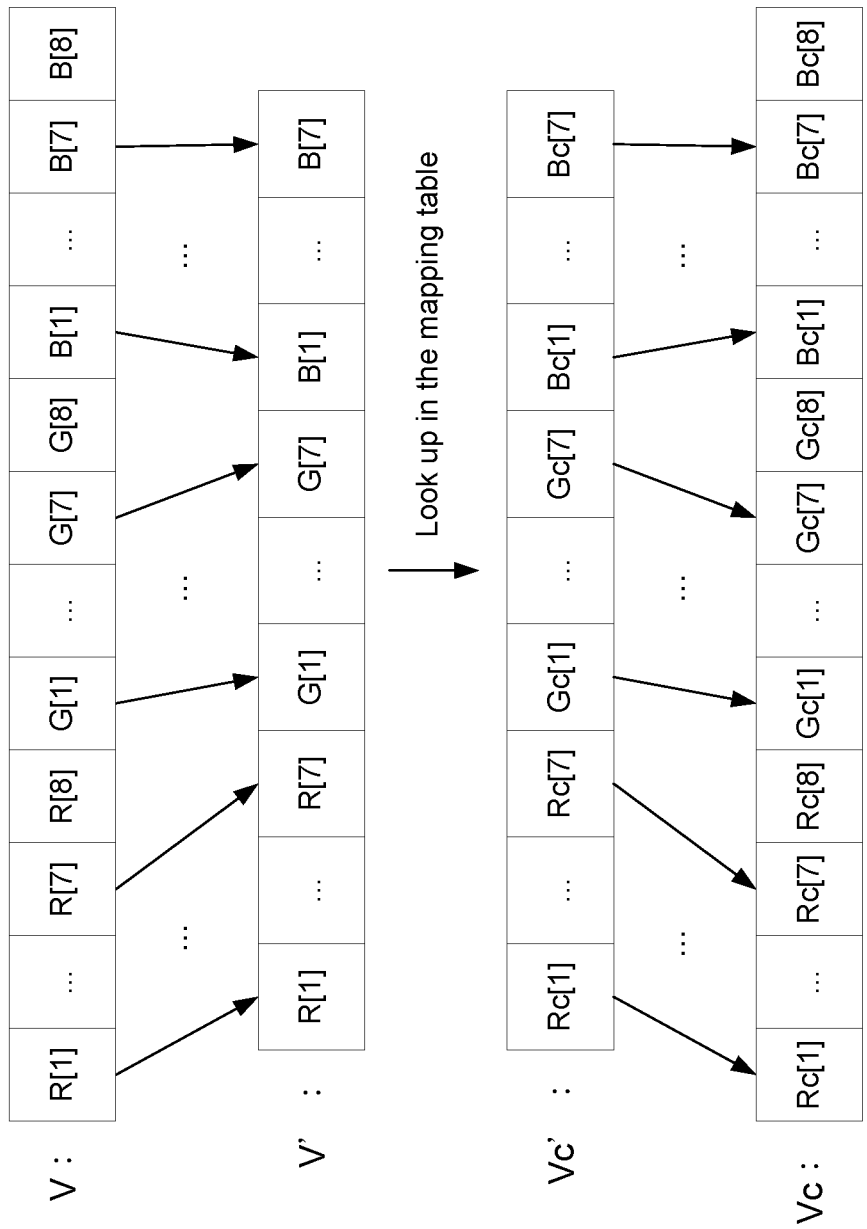
FIG. 3 is a schematic diagram illustrating conversion between one of the first image grayscale values and a corresponding one of the second image grayscale values.

Additional reference is made to FIG. 3. FIG. 3 is a schematic diagram illustrating that the converting module 120 converts one of the first image grayscale values V to a corresponding one of the second image grayscale values Vc. For simplicity of explanation, FIG. 3 is illustrated based on the embodiment shown in FIG. 1, but is not limited thereto.

In the present embodiment, n=3, m=8 and i=1. However, in practical applications, n, m and i are not limited to the abovementioned values, and persons skilled in the art can adjust the abovementioned values according to practical needs.

As shown in FIG. 3, each of the first image grayscale values V includes three first pixel grayscale values, i.e., R[1]-R[8], G[1]-G[8] and B[1]-B[8]. Each of the second image grayscale values Vc includes three corresponding second pixel grayscale values, i.e., Rc[1]-Rc[8], Gc[1]-Gc[8] and Bc[1]-Bc[8].

The converting module 120 utilizes the 21 bits V' consisting of R[1]-R[7], G[1]-G[7] and B[1]-B[7] as the memory address to look up in the mapping table, and obtains the look-up result Vc'.

The converting module 120 then sets Rc[1]-Rc[7], Gc[1]-Gc[7] and Bc[1]-Bc[7] of the look-up result Vc' to be the 1st-7th, 9th-15th and 17th-23rd bits of the corresponding second image grayscale value Vc, respectively. Moreover, the converting module 120 sets R[8], G[8] and B[9] to be the 8th, 16th and 24th bits of the corresponding second image grayscale value Vc (i.e, Rc[8], Gc[8] and Bc[8]), respectively.

In the abovementioned embodiments, the converting module 120 utilizes part of bits corresponding to each of the first image grayscale values V as the memory address to look up in the mapping table. Consequently, the memory space in the memory 110 required to save the mapping table can be greatly reduced.

To be more specific, when the converting module 120 utilizes all of the bits corresponding to each of the first image grayscale values V as the memory address to look up in the mapping table, the memory space required in the memory 110 to save the mapping table is $n \times m \times (2^{(n \times m)})$ bits. However, when the converting module 120 utilizes $n \times (m-i)$ bits corresponding to each of the first image grayscale values V as the memory address V' to look up in the mapping table, and generates the corresponding second image grayscale values Vc according to the look-up result Vc', only $n \times (m-i) \times (2^{(n \times (m-i))})$ bits in the memory 110 are required to save the mapping table.

As an example, when n=3, m=8 and i=1, when the converting module 120 utilizes all of the bits corresponding to each of the first image grayscale values V as the memory address to look up in the mapping table, the memory space in the memory 110 required to save the mapping table is $3 \times 8 \times (2^{24})$=384M bits. However, when the converting module 120 utilizes $n \times (m-i)$ bits corresponding to each of the first image grayscale values V as the memory address V' to look up in the mapping table, only $3 \times 7 \times (2^{21})$=42M bits in the memory 110 are required to save the mapping table. Consequently, 384M-42M=342M bits of memory space are saved.

Furthermore, the grayscale values of neighboring color data are usually successive values. Therefore, by utilizing the $n \times (m-i)$ bits consisting of the highest (m-i) bits of each of the n first pixel grayscale values as the memory address to look up in the mapping table, and setting the lowest bit of each of the n second pixel grayscale values to be the same as the lowest bit of a corresponding one of the n first pixel grayscale values, the successive property can be effectively kept for the grayscale values in the converted image signal. In the previous example, a near 24 bits color mapping operation is realized by utilizing a mapping table occupying 42M bits of memory space.

According to another embodiment of the present disclosure, the converting module 120 is further configured for determining whether a first image grayscale value to be converted is within an image grayscale value range, in which the first image grayscale value to be converted is one of the first image grayscale values. If the first image grayscale value to be converted is not within the image grayscale value range, the converting module 120 sets a corresponding second image grayscale value of the second image grayscale values Vc to be the same as the first image grayscale value to be converted.

In one embodiment of the present disclosure, the converting module 120 determines whether the first image grayscale value to be converted is within the image grayscale value range according to whether the n first pixel grayscale values of the first image grayscale value to be converted are within corresponding pixel grayscale value ranges.

In one embodiment, n=3, m=8 and i=1, and each of the first image grayscale value V is a 24 bits value as shown in FIG. 3. Furthermore, in that embodiment, the corresponding pixel grayscale value ranges are $0 \leq R \leq 127$, $0 \leq G \leq 127$ and $128 \leq B \leq 255$.

As an example, a first image grayscale value to be converted has R[1]-R[8] being 10010010, G[1]-G[8] being 00111101 and B[1]-B[8] being 10101011 (i.e., R=146, G=61 and B=171). Since the grayscale value of R is not within the corresponding pixel grayscale value range, $0 \leq R \leq 127$, the converting module 120 determines that the first image grayscale value to be converted is not within the image grayscale value range. Hence, the converting module 120 sets a corresponding second image grayscale value to be the same as the first image grayscale value to be converted.

In another example, a first image grayscale value to be converted has R[1]-R[8] being 01110010, G[1]-G[8] being 01010101 and B[1]-B[8] being 11001010 (i.e., R=114, G=85 and B=202). Since the grayscale values of R, G and B are within the corresponding pixel grayscale value ranges, the converting module 120 determines that the first image grayscale value to be converted is within the image grayscale value range. Hence, the converting module 120 performs the table look-up operation as shown in FIG. 3 on the first image grayscale value to be converted, so as to generate a corresponding second image grayscale value.

It is noted that the corresponding pixel grayscale value ranges are not limited to the abovementioned $0 \leq R \leq 127$, $0 \leq G \leq 127$ and $128 \leq B \leq 255$. Persons skilled in the art can adjust the abovementioned ranges according to practical needs. In another embodiment, the corresponding pixel grayscale value ranges are $64 \leq R \leq 192$, $64 \leq G \leq 192$ and $64 \leq B \leq 192$.

In the previous embodiment, by checking whether a first image grayscale value to be converted is within an image grayscale value range, the converting module 120 determines whether the table look-up operation on the first image grayscale value is performed. Consequently, the memory space in the memory 110 required to save the mapping table can be effectively reduced. Moreover, by setting the abovementioned image grayscale value range, color mappings for some specific color ranges can be realized.

Figure 4:
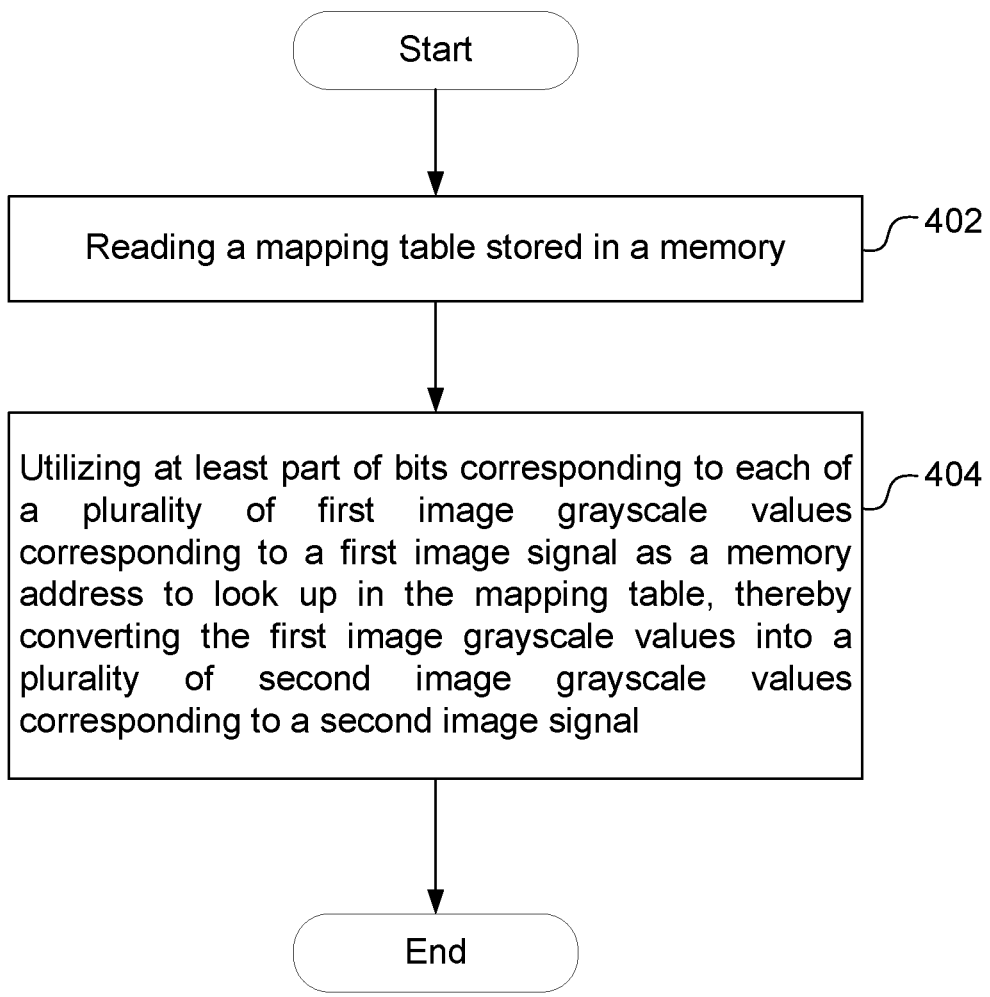
FIG. 4 is a flow chart of a real-time color mapping method in accordance with one embodiment of the present disclosure.

Reference is now made to FIG. 4. FIG. 4 is a flow chart of a real-time color mapping method in accordance with one embodiment of the present disclosure. The real-time color mapping method may be implemented by the real-time color mapping system 100 shown in FIG. 1, but is not limited in this regard. For convenience and clarity, it is assumed that the real-time color mapping method is implemented by the real-time color mapping system 100 shown in FIG. 1.

In step 402, the converting module 120 reads a mapping table stored in a memory 110.

In step 404, the converting module 120 utilizes at least part of bits V' corresponding to each of a plurality of first image grayscale values V corresponding to a first image signal 203 as a memory address to look up in the mapping table, so as to convert the first image grayscale values V into a plurality of second image grayscale values Vc corresponding to a second image signal 223.

According to one embodiment of the present disclosure, the operation of utilizing the at least part of bits corresponding to each of the first image grayscale values V as the memory address to look up in the mapping table is to utilize all of the bits corresponding to each of the first image grayscale values V as the memory address to look up in the mapping table.

According to another embodiment of the present disclosure, each of the first image grayscale values V includes n first pixel grayscale values with different colors. Each of the n first pixel grayscale values is represented by m bits. The operation of utilizing the at least part of bits corresponding to each of the first image grayscale values V as the memory address to look up in the mapping table is to utilize n×(m−i) bits corresponding to each of the first image grayscale values V as the memory address to look up in the mapping table, in which n>1 and m>i≥1.

According to still another embodiment of the present disclosure, the (m−i) bits corresponding to each of the n first pixel grayscale values are the highest (m−i) bits (e.g., as the first image grayscale values V and the bits V' illustrated in FIG. 2).

According to yet another embodiment, each of the abovementioned second image grayscale values Vc includes n corresponding second pixel grayscale values. Each of the n second pixel grayscale values is represented by m bits. Moreover, the operation of utilizing the n×(m−i) bits corresponding to each of the first image grayscale values V as the memory address to look up in the mapping table to convert the first image grayscale values V into the second image grayscale values Vc further includes: converting the n×(m−i) bits of each of the first image grayscale values V into corresponding n×(m−i) bits of each of the second image grayscale values Vc according to a look-up result (e.g., as the bits Vc' and the second image grayscale values Vc shown in FIG. 2).

According to still yet another embodiment, the (m−i) bits corresponding to each of the n first pixel grayscale values are the highest (m−i) bits (e.g., as the second image grayscale values Vc illustrated in FIG. 2).

According to another embodiment, the operation of utilizing the n×(m−i) bits corresponding to each of the first image grayscale values V as the memory address to look up in the mapping table to convert the first image grayscale values V into the second image grayscale values Vc further includes: integrating the n×i un-converted bits and the corresponding n×(m−i) converted bits of each of the first image grayscale values V to generate the corresponding second image grayscale value.

According to still another embodiment, the lowest i bits of each of the abovementioned n second pixel grayscale values are the same as the lowest i bits of each corresponding pixel grayscale value of the abovementioned n first pixel grayscale values.

According to still yet another embodiment, the operation of utilizing the at least part of bits corresponding to each of the first image grayscale values V as the memory address to look up in the mapping table to convert the first image grayscale values V into the second image grayscale values Vc further includes: determining whether a first image grayscale value to be converted is within an image grayscale value range, in which the first image grayscale value to be converted is one of the first image grayscale values V; and if the first image grayscale value to be converted is not within the image grayscale value range, setting a corresponding second image grayscale value of the second image grayscale values Vc to be the same as the first image grayscale value to be converted.

According to another embodiment, each of the first image grayscale values includes n first pixel grayscale values with different colors. Moreover, whether the first image grayscale value to be converted (from one of the first image grayscale values V) is within the image grayscale value range is determined according to whether the n first pixel grayscale values of the first image grayscale value to be converted are within corresponding pixel grayscale value ranges.

Figure 5:
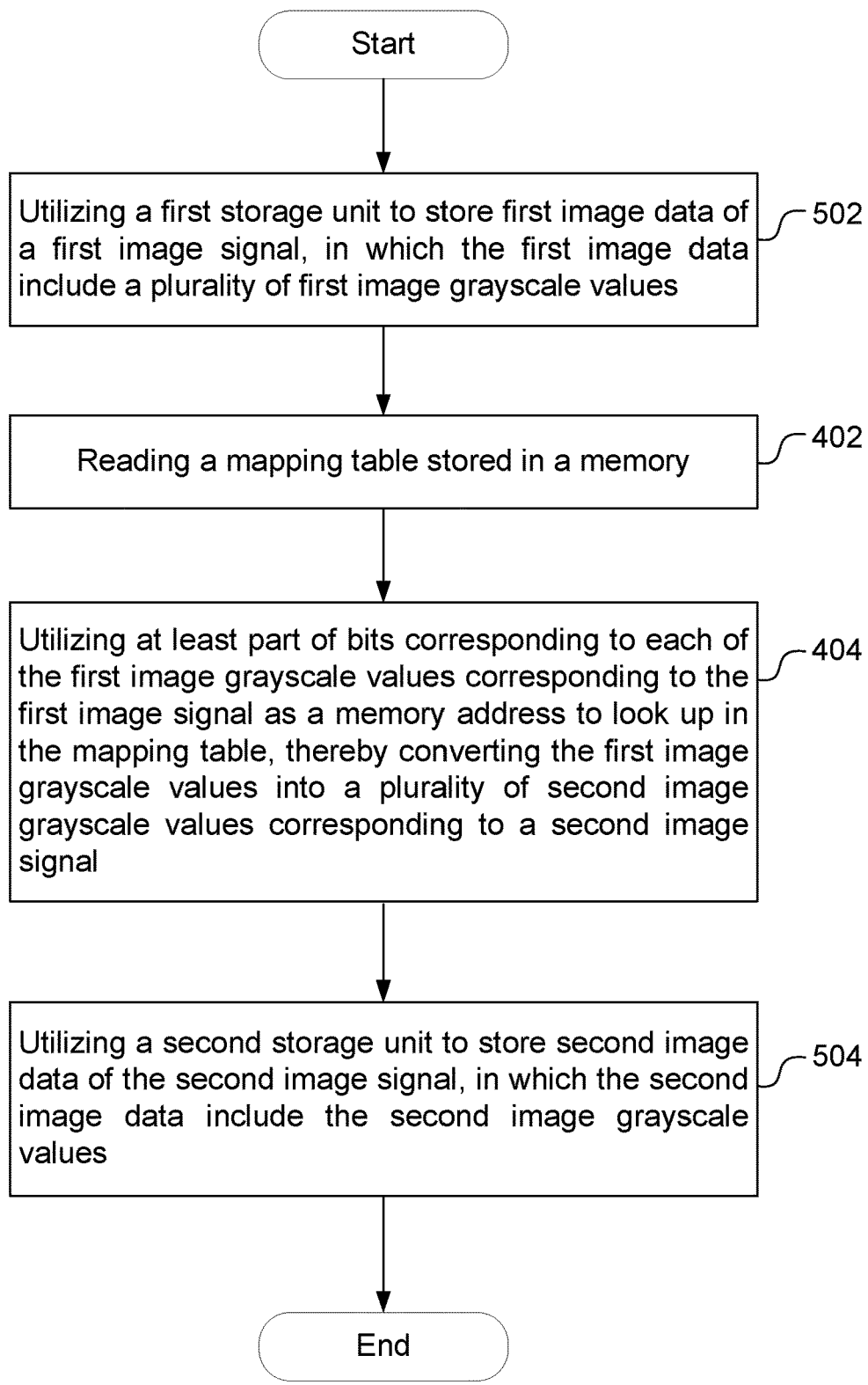
FIG. 5 is a flow chart of a real-time color mapping method in accordance with one embodiment of the present disclosure.

Reference is further made to FIG. 5. FIG. 5 is a flow chart of a real-time color mapping method in accordance with one embodiment of the present disclosure. Compared with the real-time color mapping method shown in FIG. 4, the real-time color mapping method shown in FIG. 5 further includes steps 502 and 504. The real-time color mapping method may be implemented by the real-time color mapping system 100 shown in FIG. 1, but is not limited in this regard. For convenience and clarity, it is assumed that the real-time color mapping method is implemented by the real-time color mapping system 100 shown in FIG. 1.

In step 502, the first storage unit 210 is utilized to store first image data of the first image signal 203. The first image data include a plurality of first image grayscale values V.

In step 504, the second storage unit 220 is utilized to store second image data of the second image signal 223. The second image data include the second image grayscale values Vc.

The above illustrations include exemplary operations, but the operations are not necessarily performed in the order shown. Operations may be added, replaced, changed order, and/or eliminated as appropriate, in accordance with the spirit and scope of various embodiments of the present disclosure.

In the present disclosure, by utilizing the grayscale values of image signals as the memory address to look up in the mapping table, a fast and real-time color mapping between image signals can be realized. Compared with the conventional methods (e.g., color mappings based on gamma curve adjustments), the color mapping disclosed in the present disclosure is more precise with more freedom for conversions. The present disclosure also discloses utilizing only part of bits corresponding to image grayscale values as the memory address to look up in the mapping table. Consequently, the memory space in the memory required to save the mapping table can be greatly reduced. Also, the continuity of the grayscale values can be effectively kept in the converted image signals. In one embodiment of the present disclosure, a near 24 bits color mapping can be performed by utilizing a mapping table occupying only 42M bits of memory space. Therefore, the memory required for color mappings can be reduced, and the speed of color mappings can be improved without affecting the effects of color displaying.

Moreover, the present disclosure also discloses determining whether the table look-up operation on a first image grayscale value is performed by checking whether the first image grayscale value to be converted is within an image grayscale value range. Consequently, the memory space in the memory required to save the mapping table can again be effectively reduced. Moreover, by setting the abovementioned image grayscale value range, color mappings for some specific color ranges can be realized.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A real-time color mapping system, comprising:
a memory configured to store a mapping table; and a processor configured to read the mapping table stored in the memory, and to convert a first image grayscale value into a second image grayscale value according to the mapping table, wherein the first image grayscale value represents a first color that is identified by n first grayscale values, and each of the n first grayscale values is represented by m bits, and the second image grayscale value represents a second color that is identified by n second grayscale values, and wherein the processor utilizes n×(m−i) bits consisting of the n first grayscale values as the memory address to look up in the mapping table to convert the first color into the second color, and n×(m−i)×(2^(n×(m−i))) bits in the memory are used to store the mapping table, where n>1 and m>i≥1.

2. The real-time color mapping system of claim 1, wherein the (m−i) bits corresponding to each of the n first grayscale values are the highest (m−i) bits.

3. The real-time color mapping system of claim 1, wherein each of the n second grayscale values is represented by m bits, and the processor converts the n×(m−i) bits consisting of the n first grayscale values into corresponding n×(m−i) bits consisting of the n second grayscale values according to a look-up result.

4. The real-time color mapping system of claim 3, wherein the processor is further configured to integrate n×i un-converted bits and the corresponding n×(m−i) converted bits of the n first grayscale values to generate then second grayscale values.

5. The real-time color mapping system of claim 3, wherein the (m−i) bits corresponding to each of the n second grayscale values are the highest (m−i) bits.

6. The real-time color mapping system of claim 3, wherein the lowest i bits of each of the n second grayscale values are the same as the lowest i bits of each corresponding grayscale value of the n first grayscale values.

7. The real-time color mapping system of claim 1, wherein the processor is further configured to determine whether any of the n first grayscale values to be converted is within an image grayscale value range; and
when any of the n first grayscale value to be converted is not within the image grayscale value range, the processor sets a corresponding grayscale value of the n second grayscale values to be the same as a grayscale value of the n first grayscale values to be converted.

8. The real-time color mapping system of claim 1, further comprising:
a first storage unit electrically connected with the processor, wherein the first storage unit is configured to store a first image data comprising the first image grayscale value; and
a second storage unit electrically connected with the processor, wherein the second storage unit is configured to store a second image data comprising the second image grayscale value.

9. A real-time color mapping method, comprising:
reading a mapping table stored in a memory; and
utilizing the mapping table to convert a first image grayscale value into a second image grayscale value, wherein the first image grayscale value represents a first color that is identified by n first grayscale values, and each of the n first grayscale values is represented by m bits, and the second image grayscale value represents a second color that is identified by n second grayscale values, and utilizing the mapping table to convert the first image grayscale value into the second image grayscale value further comprising:
utilizing n×(m−i) bits consisting of the n first grayscale values as the memory address to look up in the mapping table to convert the first color into the second color, and n×(m−i)×(2^(n×(m−i))) bits in the memory are used to store the mapping table, where n>1 and m>i≥1.

10. The real-time color mapping method of claim 9, wherein the (m−i) bits corresponding to each of the n first grayscale values are the highest (m−i) bits.

11. The real-time color mapping method of claim 9, wherein each of the n second grayscale values is represented by m bits, further comprising:
converting the n×(m−i) bits consisting of the n first grayscale values into corresponding n×(m−i) bits consisting of the n second grayscale values according to a look-up result.

12. The real-time color mapping method of claim 11, further comprising:
integrating n×i un-converted bits and the corresponding n×(m−i) converted bits of the n first grayscale values to generate the n second grayscale values.

13. The real-time color mapping method of claim 11, wherein the (m−i) bits corresponding to each of the n second grayscale values are the highest (m−i) bits.

14. The real-time color mapping method of claim 12, wherein the lowest i bits of each of the n second grayscale values are the same as the lowest i bits of each corresponding grayscale value of the n first grayscale values.

15. The real-time color mapping method of claim 9, further comprising:
determining whether any of the n first grayscale values to be converted is within an image grayscale value range; and when any of the n first grayscale value to be converted is not within the image grayscale value range, the converting module sets a corresponding grayscale value of the n second grayscale values to be the same as a grayscale value of the n first grayscale values to be converted.

16. The real-time color mapping method of claim 9, further comprising:
utilizing a first storage unit to store a first image data comprising the first image grayscale value; and
utilizing a second storage unit to store a second image data comprising the second image grayscale value.

* * * * *